(12) United States Patent
Ghozzi et al.

(10) Patent No.: US 8,280,311 B2
(45) Date of Patent: Oct. 2, 2012

(54) METHOD OF DETERMINING THE PRESENCE OF A TELECOMMUNICATIONS SIGNAL ON A FREQUENCY BAND

(75) Inventors: Mohamed Ghozzi, Marseille (FR); Michaël Dohler, Barcelona (ES)

(73) Assignee: France Telecom, Paris (FR)

( * ) Notice: Subject to any disclaimer, the term of this patent is extended or adjusted under 35 U.S.C. 154(b) by 524 days.

(21) Appl. No.: 12/524,605

(22) PCT Filed: Feb. 26, 2008

(86) PCT No.: PCT/FR2008/050316
§ 371 (c)(1),
(2), (4) Date: Jul. 27, 2009

(87) PCT Pub. No.: WO2008/113958
PCT Pub. Date: Sep. 25, 2008

(65) Prior Publication Data
US 2010/0105335 A1 Apr. 29, 2010

(30) Foreign Application Priority Data
Feb. 28, 2007 (FR) ...................... 07 53557

(51) Int. Cl.
*H04B 17/00* (2006.01)
(52) U.S. Cl. ..................... 455/67.11; 455/63.1
(58) Field of Classification Search ............ 455/62, 455/63.1, 67.11, 67.13, 67.14
See application file for complete search history.

(56) References Cited

U.S. PATENT DOCUMENTS 8,045,655 B2 * 10/2011 Ashish .................. 375/343
2004/0190663 A1   9/2004 Carsello et al.

FOREIGN PATENT DOCUMENTS

| EP | 0 413 361 A2 | 2/1991 |
| WO | WO 94/16342 A1 | 7/1994 |
| WO | WO 98/53630 A1 | 11/1998 |
| WO | WO 02/11378 A1 | 2/2002 |

* cited by examiner

*Primary Examiner* — Ping Hsieh
(74) *Attorney, Agent, or Firm* — Drinker Biddle & Reath LLP

(57) ABSTRACT

The invention relates to a method of determining the presence of a telecommunications signal on a frequency band, said signal being assumed cyclostationary, comprising steps of:
  determining an energy vector $\hat{T}$ (14) comprising m components respectively representative of energy values of an autocorrelation function of the signal received on said frequency band for m shift times,
  calculating correlation elements (15) between the m components of the energy vector $\hat{T}$,
  performing a statistical calculation (16) on the correlation elements calculated so as to determine a statistical indicator $\lambda$,
  comparing (17) the statistical indicator obtained $\lambda$ with a predetermined threshold with the aim of determining the presence of a telecommunications signal on said frequency band.

9 Claims, 2 Drawing Sheets

METHOD OF DETERMINING THE PRESENCE OF A TELECOMMUNICATIONS SIGNAL ON A FREQUENCY BAND

CROSS-REFERENCE TO RELATED APPLICATIONS

This application is the U.S. national phase of the International Patent Application No. PCT/FR2008/050316 filed Feb. 26, 2008, which claims the benefit of French Application No. 07 53557 filed Feb. 28, 2007, the entire content of which is incorporated herein by reference.

FIELD OF THE INVENTION

The present invention lies in the field of cognitive radio and relates more particularly to the determination of the presence of a telecommunications signal on a frequency band.

BACKGROUND OF THE INVENTION

In the absence of any signal, the frequency band is considered to be free. In the converse case, it is considered to be occupied.

With the development of telecommunications, optimization of the use of the radio spectrum is becoming an increasingly significant concern for telecommunications operators.

Indeed, the number of applications using the radio spectrum is growing and numerous new applications are also becoming increasingly greedy for frequencies such as for example UMTS (for Universal Mobile Telecommunications System in English) and Wifi.

Moreover, a study conducted in November 2002 by the FCC (for Federal Communications Commission in English) has revealed the fact that the radio spectrum is not used effectively. Thus, at a given instant and for a given geographical place, there is a large probability of finding free frequency bands in the radio spectrum.

Access to the radio spectrum for the provision of services makes it necessary to benefit from a licence. However, the FCC has recently authorized free access, that is to say without a licence, to those of the free frequency bands whose use is normally intended for television. Access to these particular free frequency bands must be effected from radio systems able to implement the principles of the field of cognitive radio, that is to say be capable of collecting certain parameters on their environment so as in particular to detect free frequency bands.

Consequently, optimization of the use of the radio spectrum involves detecting free frequency bands.

Several solutions have already been proposed for detecting free frequency bands.

Some of these solutions are based on geo-location. The position of a terminal which incorporates a GPS function (for Global Positioning System in English) is given by satellite. The terminal accesses databases which, as a function of its position, provide it with the state of the radio spectrum. Certain terminals can be preprogrammed and can incorporate databases directly. The drawback of solutions of this type is that they are constraining and of limited use. Indeed, the terminal must be able to determine its geographical position and interrogate a database or else be used in a predetermined geographical zone corresponding to the incorporated database.

Other solutions such as radiometric (or energy-based) detection are based on detecting a signal in the noise on a radio frequency band. These techniques consist in measuring the energy of the signal. If the energy is greater than a certain predetermined threshold taking account of the noise level, then it is deduced therefrom that a telecommunications signal is present on the frequency band considered. These solutions exhibit the drawback of requiring a priori knowledge about the noise level.

Another type of solution for detecting a signal on a radio frequency band is based on revealing the cyclostationary nature of the telecommunications signals. Cyclostationary signals possess statistics (mean and autocorrelation) that are time dependent and periodic over time. The frequency of the autocorrelation function of a cyclostationary signal is cyclic. The noise is for its part modeled as a stationary signal whose statistics are independent of time. The distinction between a telecommunications signal and noise is made by applying a test of cyclic frequencies. If the cyclic nature of the frequency of the autocorrelation function of the signal received is revealed then it may be concluded that a telecommunications signal is present on the frequency band considered. The drawback of the existing solutions relying on the cyclostationary nature of telecommunications signals is of being able to detect only one cyclic frequency at a time. These solutions also exhibit the drawback of requiring a priori knowledge of the cyclic frequencies of the signals which may appear on the frequency band considered.

The drawback of the existing solutions is that they do not allow the detection on a given frequency band of a telecommunications signal without having a little a priori knowledge either about this signal or about the noise.

There therefore exists a requirement for a technique making it possible to detect a possible telecommunications signal on a given frequency band without a priori knowledge of this signal.

SUMMARY OF THE INVENTION

For this purpose, the subject of the invention is a method of determining the presence of a telecommunications signal on a frequency band, said signal being assumed cyclostationary, characterized in that it comprises:

a step of determining an energy vector $\hat{T}$ comprising m components respectively representative of energy values of an autocorrelation function of the signal received on said frequency band for m shift times, a step of calculating correlation elements between the m components of the energy vector $\hat{T}$, a step of performing a statistical calculation on the correlation elements calculated so as to determine a statistical indicator $\lambda$, a step of comparing the statistical indicator obtained $\lambda$ with a predetermined threshold with the aim of determining the presence of a telecommunications signal on said frequency band.

Ultimately, the method of determining the presence of a telecommunications signal on a frequency band of the invention consists in testing whether the autocorrelation function of the signal does or does not exhibit a significant quantity of energy on the frequency band studied.

The invention exhibits the advantage of allowing the detection of one or more arbitrary telecommunications signals, other than noise, on a frequency band.

This method also has the advantages of not requiring any a priori knowledge of the signal and of making it possible to test the whole of the frequency band in a single operation.

According to a preferred embodiment, the step of determining the energy vector $\hat{T}$ comprises at least one sub-step of calculating a first vector with m components Y(n), a component of order n of the vector resulting from the product of the value of the signal received at a given instant n with the value of the signal received at a shifted instant n+τ.

The test used to determine the presence of a telecommunications signal on a frequency band relies solely on the cyclostationary nature of the telecommunications signals and the properties which stem therefrom. In particular, a cyclostationary signal possesses statistics (mean and autocorrelation) that are time dependent and periodic over time. To reveal the cyclostationary nature of the signal received, N samples of the signal each corresponding to a given instant n are gathered, as are the samples of the same signal shifted in time.

One of the advantages of the invention is that the algorithm used requires only a limited number of data of the signal.

According to a preferred characteristic, the step of determining the energy vector $\hat{T}$ comprises at least
a sub-step of determining a filtering function h(n) whose coefficients are obtained on the basis of predetermined frequencies α min and α max;
a sub-step of calculating a second vector Z(n) with m components resulting from the convolution product of the filtering function h(n) with the first vector Y(n).

Several different telecommunications signals can be conveyed on one and the same frequency band, these signals having different cyclic frequencies. By choosing the characteristics of the filter applied to the signal received it is possible to detect any telecommunications signal and to study all or part of the frequency band.

Thus, one of the advantages of the invention is to allow blind detection of any signal present on the frequency band. Another advantage is to be able to study the whole of the frequency band at once or to limit the width of the band studied.

According to a preferred characteristic, the m components of the vector $\hat{T}$ are dependent on the sum for all the values of n of the product of the value of the component of the vector Y(n) at the instant n with the value of the component of the vector Z(n) at the same instant n.

The components of the energy vector result from simple calculations applied to the signal samples gathered.

The invention exhibits a simple calculation algorithm and exhibits the advantage of requiring only a single analysis of the signal.

According to a preferred embodiment, the step of calculating the correlation elements between the m components of the energy vector $\hat{T}$ is performed by determining a covariance matrix Q whose elements correspond to the covariance between each of the components of the energy vector $\hat{T}$ taken pairwise.

The invention has the advantage of implementing a simple calculation algorithm on a limited number of data thus making it possible to limit the calculation time required to obtain a result.

According to a preferred characteristic, the statistical indicator λ is obtained on the basis of the energy vector $\hat{T}$ and of the covariance matrix Q.

In a particular embodiment, the statistical indicator λ results from the product of the energy vector $\hat{T}$ times the inverse of the covariance matrix Q and times the transpose of the vector $\hat{T}$.

Advantageously, the statistical indicator (λ) follows a so-called chi-squared law ($\chi^2$).

According to a preferred characteristic, the threshold with which the statistical indicator is compared is determined on the basis of the centered chi-squared law $\chi^2$.

The subject of the invention is also a device for determining the presence of a telecommunications signal on a frequency band, said signal being assumed cyclostationary, characterized in that it comprises:
a processing module adapted for determining an energy vector $\hat{T}$ comprising m components respectively representative of energy values of an autocorrelation function of the signal received on said frequency band for m shift times,
a unit for calculating correlation elements between the m components of the energy vector $\hat{T}$,
a unit for statistical calculation on the correlation elements calculated so as to determine a statistical indicator λ,
a comparison module for comparing the statistical indicator obtained λ with a predetermined threshold with the aim of determining the presence of a telecommunications signal on said frequency band.

The invention also pertains to an apparatus for communication through a network comprising a device for determining the presence of a telecommunications signal on a frequency band, said signal being assumed cyclostationary, according to the method described above.

The subject of the invention is also a computer program comprising instructions for implementing the method described above when the program is executed by a computer.

BRIEF DESCRIPTION OF THE DRAWINGS

The invention will be better understood in the light of the description which follows of a particular embodiment of the method according to the invention for determining the presence of a telecommunications signal on a frequency band and of a corresponding device, with reference to the appended drawings in which.

DETAILED DESCRIPTION

Figure 1:
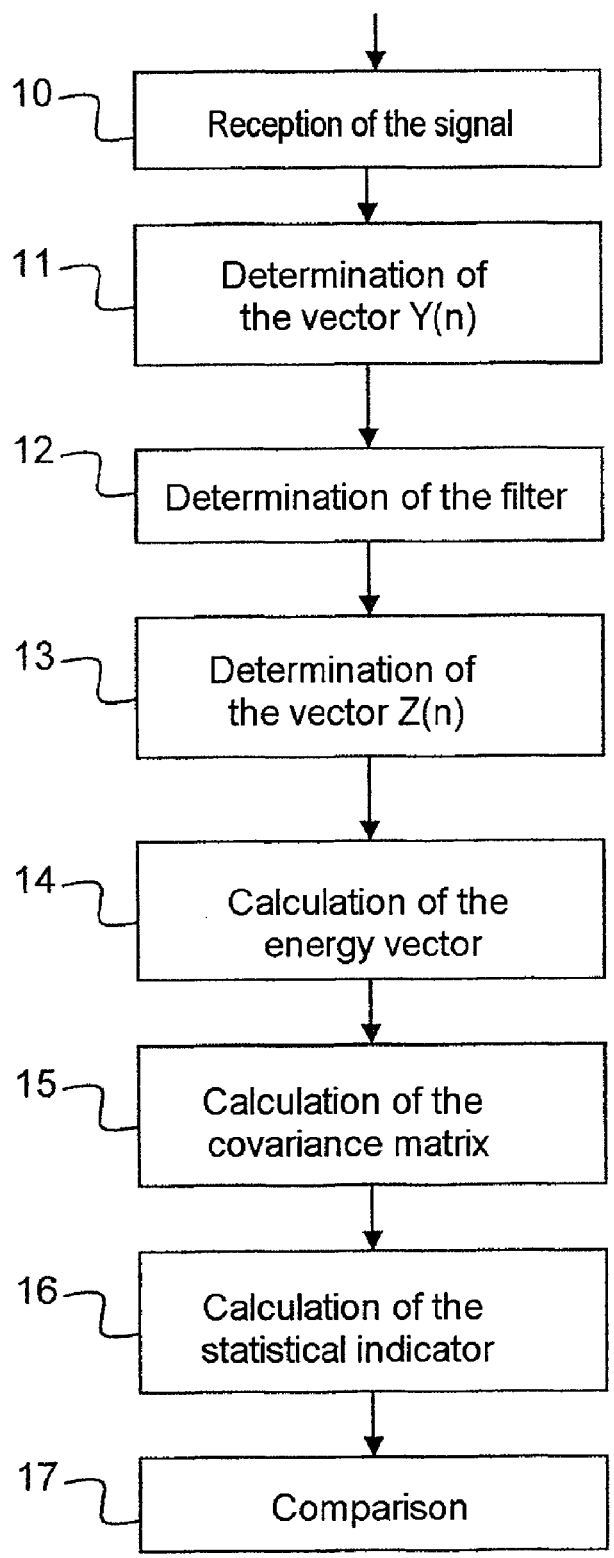
FIG. 1 represents a flowchart of the method of the invention according to the particular embodiment described.

The invention relies on the properties of a telecommunications signal, it being possible for the latter to be modeled as a cyclostationary signal. In particular, a cyclostationary signal exhibits statistics (mean and autocorrelation) that are time dependent and periodic over time. The frequency associated with this periodicity is called the cyclic frequency.

Consider a radio signal received and sampled r(n), n representing the index of the instant of the sampling considered. This signal r(n) is composed of noise b(n) and of at least one cyclostationary telecommunications signal s(n) that one seeks to detect and whose cyclic frequency is not known such that:

$$r(n)=s(n)+b(n).$$

Then, the radio signal received r(n) is itself also cyclostationary.

According to the properties of cyclostationary signals, the statistics carried out on the basis of signal samples r(n) (that is to say the functions applied to the signal samples) of order less than or equal to two, for example the mean and the autocorrelation, provide results that are time dependent and periodic over time.

Thus a statistic of order one carried out on the basis of signal samples such as the mean $m_r$ is identical for two instants shifted by a cyclic period $N_0$, i.e.:

$$m_r(n)=m_r(n+N_0) \text{ with } m_r(n)=E\{r(n)\}$$

where:
E is the mathematical expectation operator,
$N_0$ is the cyclic period of the signal of value equal to the inverse of the cyclic frequency of this signal.

Likewise, a statistic of order two such as the autocorrelation function $R_r$ of the signal is identical for two instants shifted by a cyclic period $N_0$, i.e.:

$$R_r(n,\tau)=R_r(n+N_0,\tau) \text{ with } R_r(n,\tau)=E\{r(n)\cdot r(n+\tau)\}$$

where:
E is the mathematical expectation operator,
$N_0$ is the cyclic period of the signal,
$\tau$ is a shift time with respect to the instant n corresponding to the value of the signal r(n).

Consider now $S(\tau)$ the energy of the signal autocorrelation function r(n):

$$S(\tau) = \sum_{\alpha \neq 0} |R^\alpha(\tau)|^2$$

with $$R_r(n, \tau) = \sum_k R_r^{k/N_0}(\tau) e^{j2\pi \frac{k}{N_0} n}$$

and $$R_r^\alpha(\tau) = \frac{1}{N_0} \sum_{l=0}^{N_0-1} R_r(l, \tau) \cdot e^{-j2\pi (l \cdot T_e) \alpha}$$

where:
$T_e$ is the signal sampling period,
$N_0$ is the cyclic period of the signal
$\tau$ is a shift time with respect to the instant n corresponding to the value of the signal r(n).

If a telecommunications signal is present, there exists an unknown but nonzero frequency $\alpha_0$ such that $R_r^\alpha(\tau)$ is nonzero for certain values of the delay $\tau$.

The implementation of the invention consists in calculating the energy $S(\tau)$ over a set of values of the delay $\tau$. If $S(\tau)$ is zero for all the values of $\tau$ then it is considered that the tested frequency band is free. In the converse case, that is to say if $S(\tau)$ is nonzero for at least one value of $\tau$, it is considered that the tested frequency band is occupied.

Given that $S(\tau)$ is a sum of squared terms, it is not possible to find an estimation for it which is zero when the band is free and nonzero when the band is occupied. For this purpose, an equivalent quantity $T(\tau)=\gamma S(\tau)$ is estimated which expresses the behavior of $S(\tau)$.

With reference to FIG. 1, the method of the invention is described hereinafter in a particular application to a terminal able to implement the principles of the field of cognitive radio. When operating, to transmit and/or receive signals in a telecommunications network, the terminal considered determines whether a frequency band is free by detecting the presence or otherwise of a telecommunications signal on this frequency band. The terminal has no a priori knowledge about the telecommunications signal which could be present on the frequency band studied. The presence of a telecommunications signal is revealed by calculating a statistical indicator regarding the estimation of the energy of the signal autocorrelation function.

In a first phase, the data are gathered relating to the signal received on a frequency band B for which one wishes to determine whether it is free or occupied.

In step 10, the signal r(t) received over the time interval [0, N−1] is sampled and N samples r(n) each corresponding to an instant n are obtained.

The principle of the invention relying on the properties of cyclostationary signals (statistics that are time dependent and periodic over time), the values r(n+τ) for m shift times τ with respect to the instant n are also gathered.

In step 11, a first instantaneous vector Y(n) is determined at the instant n, for n belonging to the interval [0, N−1], comprising m components $y_\tau(n)$ corresponding respectively to the m shift times τ. Each component $y_\tau(n)$ of Y(n), with τ varying from $\tau_1$ to $\tau_m$, is defined by:

$$y_\tau(n)=r(n)\cdot r(n+\tau)$$

If the frequency band B studied is occupied, it supports at least one cyclostationary signal r(n) whose autocorrelation function comprises one or more cyclic frequencies. In the context of the invention, namely without any a priori knowledge of the signal, the terminal is totally ignorant of the values of these cyclic frequencies. Nevertheless, it is capable of situating them between a minimum value $\alpha_{min}$ and a maximum value $\alpha_{max}$, these two values depending on the applications which can be supported by the frequency band considered. The values $\alpha_{min}$ and $\alpha_{max}$ are chosen in such a way that any telecommunications signal present on the frequency band studied can be detected. Consider for example the UHF band (for Ultra High Frequency in English) lying between 470 and 862 MHz; it is used for broadcasting terrestrial analog television and for broadcasting terrestrial digital television. It can support analog television signals and digital television signals. On this frequency band, the analog television signal has only a single cyclic frequency which is 15625 Hz. The digital television signal can have various cyclic frequencies as a function of the configuration; the configuration including inter alia the width of the television channel. For example, for a given configuration, the digital television signal can have one of the following 4 cyclic frequencies: 3571 Hz, 3968 Hz, 4201 Hz, 4329 Hz. In order to detect either one or the other of the signals present on the frequency band, the values $\alpha_{min}$ and $\alpha_{max}$ are chosen in such a way that for example $\alpha_{min}$=2000 Hz and $\alpha_{max}$=17000 Hz.

Thus, to detect any telecommunications signal whatsoever present on the frequency band, a filter h(n) is specified in step 12 such that its Fourier transform H(α) has a modulus and a phase that are defined by:

if $\alpha \notin [\alpha_{min}, \alpha_{max}]$ then $|H(\alpha)| = 0$ and $\arg[H(\alpha)]$ is arbitrary, if $\alpha \in [\alpha_{min}, \alpha_{max}]$ then $|H(\alpha)| = 1$ and $$|\arg[H(\alpha)]| = \left(1 + (-1)^{int(\frac{\alpha - \alpha_{min}}{\delta \alpha})}\right) \cdot \frac{\pi}{2}$$

where:
$|\bullet|$ is the modulus operation,
arg ( ) provides the phase of its argument,
int ( ) provides the integer closest to its argument,
$\delta\alpha$ is the frequency-wise sampling increment,
$\alpha_{min}$ is strictly positive.

Thereafter, in step 13 a second instantaneous vector Z(n) is determined at the instant n, for n belonging to the interval [0, N−1], comprising m components $z_\tau(n)$ corresponding respectively to the m shift times τ. Each component $z_\tau(n)$ of Z(n), with τ varying from $\tau_1$ to $\tau_m$, is defined by:

$$z_\tau(n)=h(n)\otimes y_\tau(n)$$

where:
$\otimes$ is the convolution operator.

In a second phase, the previously gathered data make it possible to determine during step 14 the vector $\hat{T}$ estimating the quantity $T(\tau)$ which expresses the behavior of the energy of the autocorrelation function of the signal $S(\tau)$ such that:

$$\hat{T} = [\hat{T}(\tau_1), K, \hat{T}(\tau_m)]$$

with $$\hat{T}(\tau) = \frac{1}{N^2} \sum_{n=0}^{N-1} y_\tau(n) \cdot z_\tau(n).$$

where:
  $\tau_i$ with $1 \leq i \leq m$ represents various shift times with respect to the instant n corresponding to the value of the signal r(n)
  N corresponds to the number of samples of the signal.

If a telecommunications signal is present on the frequency band, there exists at least one value of $\tau_i$ for which the energy $S(\tau)$ of the signal autocorrelation function is nonzero.

If this assumption is applied to the vector $\hat{T}$, the estimator of the behavior of the energy of the signal autocorrelation function and whose various components are random, there exists at least one component of the vector $\hat{T}$ whose mean is not zero. Conversely, if no telecommunications signal is present on the frequency band, all the components of the vector $\hat{T}$ have a zero mean.

In a third phase, it is determined whether there exists at least one component of the vector $\hat{T}$ having a nonzero mean.

For this purpose, initially, in step 15, the correlation elements between the m components of the vector $\hat{T}$ are determined by calculating the covariance matrix Q such that:

$$Q = [q_{ij}]_{i,j=1}^{m}$$

with $$q_{ij} = \text{cov}\{\hat{T}(\tau_i), \hat{T}(\tau_j)\}.$$

where:
  i and j, with $1 \leq i,j \leq m$ represent the respective indices of two shift times $\tau_i$, $\tau_j$ with respect to the instant n of reception of the signal r(n)
  m represents the total number of shift times.

In a particular embodiment of the invention, the covariance between two components of the vector $\hat{T}$ can be obtained in the following manner:

$$\text{cov}\{\hat{T}(\tau), \hat{T}(\rho)\} = \frac{1}{N} \text{Re}\{S_{f_{\tau,\rho}}(0)\}$$

in which, $S_{f_{\tau,\rho}}(\alpha)$ is the cross-spectrum of $$f_\tau(n) = \frac{1}{N} y_\tau(n) z_\tau(n) \text{ and}$$

$$f_\rho(n) = \frac{1}{N} y_\rho(n) z_\rho(n)$$

and where:
  Re represents the real part of the expression considered,
  N corresponds to the number of samples of the signal.

Subsequently, in step 16, the statistical indicator $\lambda$ representative of the mean of the m components of the vector $\hat{T}$ is calculated. The statistical indicator $\lambda$ results from the product of the energy vector $\hat{T}$ times the inverse of the covariance matrix Q and times the transpose of the vector $\hat{T}$ i.e.:

$$\lambda = \hat{T} Q^{-1} \hat{T}^t$$

where:
  $Q^{-1}$ is the matrix inverse of Q
  $\hat{T}^t$ is the vector transpose of the vector $\hat{T}$.

The statistical indicator $\lambda$ follows a so-called chi-squared law ($\chi^2$) which may be centered or non-centered. If the signal received is not cyclostationary, the statistical indicator $\lambda$ follows a so-called centered chi-squared law. Conversely, if the signal received is cyclostationary, the statistical indicator $\lambda$ follows a so-called non-centered chi-squared law.

On the basis of the table of the so-called centered chi-squared law, a threshold $\zeta$ is determined such that $P_{fa} = \text{Pro}\{\chi^2 \geq \zeta\}$ corresponds to a false alarm probability, stated otherwise to the determination of the presence of a telecommunications signal on the frequency band considered although there is none.

In the comparison step 17, if the statistical indicator $\lambda$ is greater than or equal to $\zeta (\lambda \geq \zeta)$, it is then considered that it follows a so-called non-centered chi-squared law. In this case, there exists at least one telecommunications signal on the frequency band studied and therefore the latter is considered to be occupied.

If the statistical indicator $\lambda$ is strictly less than $\zeta$ ($\lambda < \zeta$), it is then considered that it follows a so-called centered chi-squared law. In this case, the frequency band studied is considered to be free.

Figure 2:
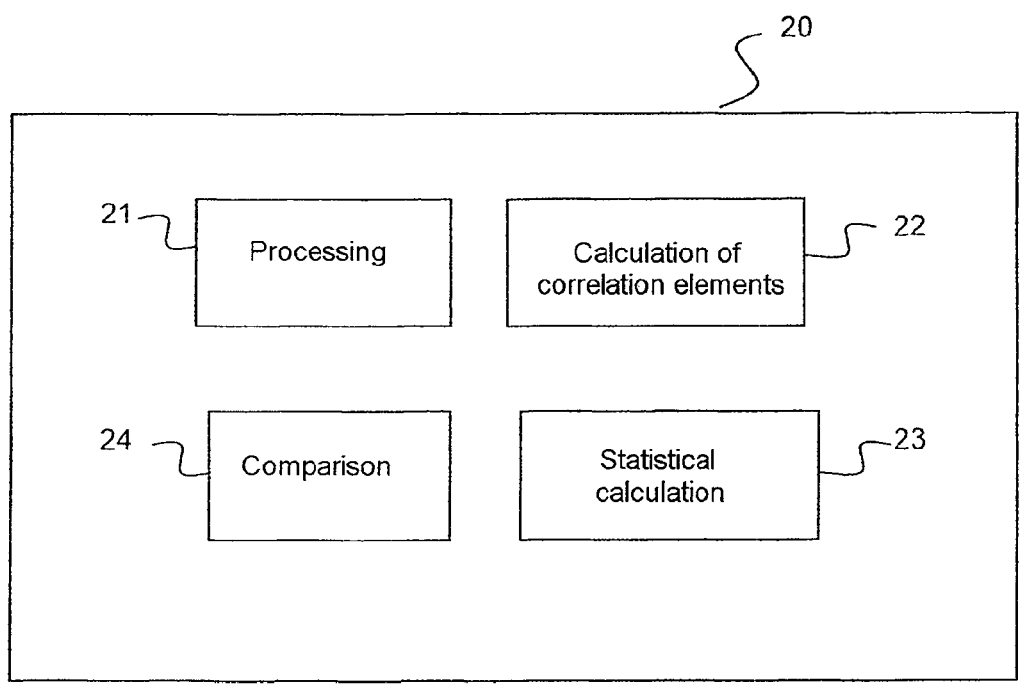
FIG. 2 represents the device able to implement the method of FIG. 1.

FIG. 2 illustrates a device 20 for determining the presence of a telecommunications signal on a frequency band.

This device comprises a processing module 21 adapted for determining an energy vector $\hat{T}$ comprising m components respectively representative of energy values of an autocorrelation function of the signal received on said frequency band for m shift times.

This processing module receives the signal r(t) which is sampled to obtain N samples r(n) each corresponding to an instant n. The processing module 21 also makes it possible to gather the values $r(n\alpha\tau)$ for m shift times $\tau$ with respect to the instant n. On the basis of the samples of the signal received, the processing module 21 implements steps 11, 12, 13 and 14 described above. Thus, the processing module 21, determines a first instantaneous vector Y(n), a filter h(n) and a second instantaneous vector Z(n) and then on the basis of the various elements obtained calculates an energy vector $\hat{T}$.

It also comprises a unit 22 for calculating correlation elements between the m components of the energy vector $\hat{T}$. The calculation unit 22 makes it possible to calculate the covariance matrix Q representative of the various correlation elements between the m components of the vector $\hat{T}$ such as described above in step 15.

This device also comprises a unit 23 for statistical calculation on the correlation elements calculated so as to determine a statistical indicator $\lambda$.

With reference to step 16 of the method described above, the calculation unit 23 calculates the statistical indicator $\lambda$ representative of the mean of the m components of the vector $\hat{T}$.

The device also comprises a comparison module 24 for comparing the statistical indicator obtained with a predetermined threshold with the aim of determining the presence of a telecommunications signal on said frequency band. The module 24 receives the statistical indicator $\lambda$ that it compares with a predetermined threshold $\zeta$, such as is described with reference to step 17. The module 24 delivers as output the indication of presence or absence of a telecommunications signal on the frequency band.

The device 20 furthermore comprises a central control unit, not represented, connected to each of the modules 21 to 24 and adapted for controlling their operation.

The modules 21 to 24 can be software modules forming a computer program. The invention therefore also relates to a computer program for a device for determining the presence of a telecommunications signal on a frequency band comprising software instructions for the execution of the method described above by the device. The software module can be stored in or transmitted by a data medium. The latter can be a hardware storage medium, for example a CD-ROM, a magnetic diskette or a hard disk, or else a transmissible medium such as an electrical, optical or radio signal.

The device 20 for determining the presence of a telecommunications signal on a frequency band can be integrated into an apparatus for radio communication through a network, for example a mobile terminal or a radio entity of the network. The invention also relates to such an apparatus.

In the foregoing description, each of the m components of the energy vector $\hat{T}$, determined for a shift time $\tau$ with respect to the instant n of reception of the signal r(n), with n belonging to the interval [0, N−1], is obtained by taking the mean of the N values resulting from the product of the value of the component of the first instantaneous vector Y(n) at the instant n with the value of the component of the second instantaneous vector Z(n) at the same instant n. In another embodiment of the invention, each of the m components of the energy vector $\hat{T}$ is obtained by taking the mean of the N values resulting from the square of the value of the component of the second instantaneous vector Z(n) at the instant n. In this embodiment, the second instantaneous vector Z(n) is also obtained by applying a filter to the first instantaneous vector Y(n). This embodiment makes it possible to simplify the processing module 21 of the device 20 for determining the presence of a telecommunications signal on a frequency band to perform the function for calculating the energy vector $\hat{T}$.

In another embodiment, the calculation of the statistical indicator $\lambda$ representative of the mean of the m components of the energy vector $\hat{T}$ is carried out on the basis of the covariance matrix Q, only the diagonal components of which have been preserved.

Let then in this embodiment the statistical indicator $\lambda$ be:

$$l = \sum_{i=1}^{m} \frac{(\hat{T}(\tau_i))^2}{q_{ii}}$$

with $$q_{ii} = \text{cov}\{\hat{T}(\tau_i), \hat{T}(\tau_i)\}$$

where:
i, with $1 \leq i \leq m$ represents the index of a shift time $\tau_i$ with respect to the instant n of reception of the signal r(n)
m represents the total number of shift times.

This embodiment allows simplified and faster calculation of the statistical indicator $\lambda$.

The invention claimed is:

1. A method of determining the presence of a cyclostationary telecommunications signal on a frequency band, said method comprising the steps of:
/a/ determining an energy vector $\hat{T}$ comprising m components respectively representative of energy values of an autocorrelation function of the signal received on said frequency band for m shift times;
/b/ calculating correlation elements between the m components of the energy vector $\hat{T}$;
/c/ performing a statistical calculation on the correlation elements calculated so as to determine a statistical indicator l; and
/d/ comparing the statistical indicator obtained l with a predetermined threshold to determine the presence of a telecommunications signal on said frequency band,
wherein step /a/ of determining the energy vector $\hat{T}$ comprises:
a sub-step of calculating a first vector with m components Y(n), a component of order n of the vector resulting from the product of the value of the signal received at a given instant n with the value of the signal received at a shifted instant n+τ;
a sub-step of determining a filtering function h(n) whose coefficients are obtained on the basis of predetermined frequencies αmin and αmax; and
a sub-step of calculating a second vector Z(n) with m components resulting from the convolution product of the filtering function h(n) with the first vector Y(n),
wherein the m components of the vector $\hat{T}$ are dependent on the sum for all the values of n of the product of the value of the component of the vector Y(n) at the instant n with the value of the component of the vector Z(n) at the same instant n.

2. A method according to claim 1, wherein step /b/ of calculating the correlation elements between the m components of the energy vector $\hat{T}$ is performed by determining a covariance matrix Q whose elements correspond to the covariance between each of the components of the energy vector $\hat{T}$ taken pairwise.

3. A method according to claim 2, wherein the statistical indicator l is obtained on the basis of the energy vector $\hat{T}$ and of the covariance matrix Q.

4. A method according to claim 3, wherein the statistical indicator l results from the product of the energy vector $\hat{T}$ times the inverse of the covariance matrix Q and times the transpose of the vector $\hat{T}$.

5. A method according to claim 1, wherein the statistical indicator l follows a so-called chi-squared law $\chi^2$.

6. A method according to claim 5, in which the threshold with which the statistical indicator is compared is determined on the basis of the centered chi-squared law $\chi^2$.

7. A non-transitory computer-readable storage medium storing a computer program comprising instructions for implementing the method according to claim 1 when the program is executed by a computer.

8. A device for determining the presence of a cyclostationary telecommunications signal on a frequency band, said device comprising:
a processing module that determines an energy vector $\hat{T}$ comprising m components respectively representative of energy values of an autocorrelation function of the signal received on said frequency band for m shift times by
calculating a first vector with m components Y(n), a component of order n of the vector resulting from the product of the value of the signal received at a given instant n with the value of the signal received at a shifted instant n+τ,
determining a filtering function h(n) whose coefficients are obtained on the basis of predetermined frequencies αmin and αmax, and calculating a second vector Z(n) with m components resulting from the convolution product of the filtering function h(n) with the first vector Y(n), a unit for calculating correlation elements between the m components of the energy vector $\hat{T}$, a unit for statistical calculation on the correlation elements calculated so as to determine a statistical indicator l, and a comparison module for comparing the statistical indicator obtained l with a predetermined threshold to determine the presence of a telecommunications signal on said frequency band, wherein the m components of the vector $\hat{T}$ are dependent on the sum for all the values of n of the product of the value of the component of the vector Y(n) at the instant n with the value of the component of the vector Z(n) at the same instant n.

9. An apparatus for communication through a network comprising a device for determining the presence of a telecommunications signal on a frequency band, said signal being assumed cyclostationary, according to claim 8.

* * * * *